United States Patent [19]

Wells et al.

[11] Patent Number: 4,673,614
[45] Date of Patent: Jun. 16, 1987

[54] ROOF INSULATION BOARD AND METHOD OF MAKING

[75] Inventors: James R. Wells, Heath; Donald C. Portfolio, Newark; Richard B. Beck, Granville, all of Ohio

[73] Assignee: Owens-Corning Fiberglas Corporation, Toledo, Ohio

[21] Appl. No.: 915,168

[22] Filed: Oct. 3, 1986

[51] Int. Cl.⁴ .................. B32B 7/12; B32B 11/04; B32B 11/06
[52] U.S. Cl. .................................. 428/285; 156/78; 428/317.5; 428/319.1; 428/489; 428/491
[58] Field of Search ............ 428/285, 317.5, 319.1, 428/489, 491; 156/78

[56] References Cited

U.S. PATENT DOCUMENTS

| | | | |
|---|---|---|---|
| 2,132,969 | 10/1938 | Rau | 521/181 |
| 2,550,465 | 4/1951 | Gorski | 428/360 |
| 3,050,427 | 8/1962 | Slayter et al. | 428/245 |
| 3,144,376 | 8/1964 | Plumberg et al. | 428/202 |
| 3,853,683 | 12/1974 | Stapleford et al. | 428/339 |
| 3,874,980 | 4/1975 | Richards et al. | 428/317.9 |
| 3,922,425 | 11/1975 | Plumberg | 428/489 |
| 4,399,186 | 8/1983 | Lauderback | 428/489 |
| 4,610,922 | 9/1986 | Kumasaka et al. | 428/317.9 |

Primary Examiner—William J. Van Balen
Attorney, Agent, or Firm—Ronald C. Hudgens; Ted C. Gillespie

[57] ABSTRACT

A glass fiber board having a facing adhered to one of two major faces thereof by foamed asphalt adhesive.

4 Claims, 2 Drawing Figures

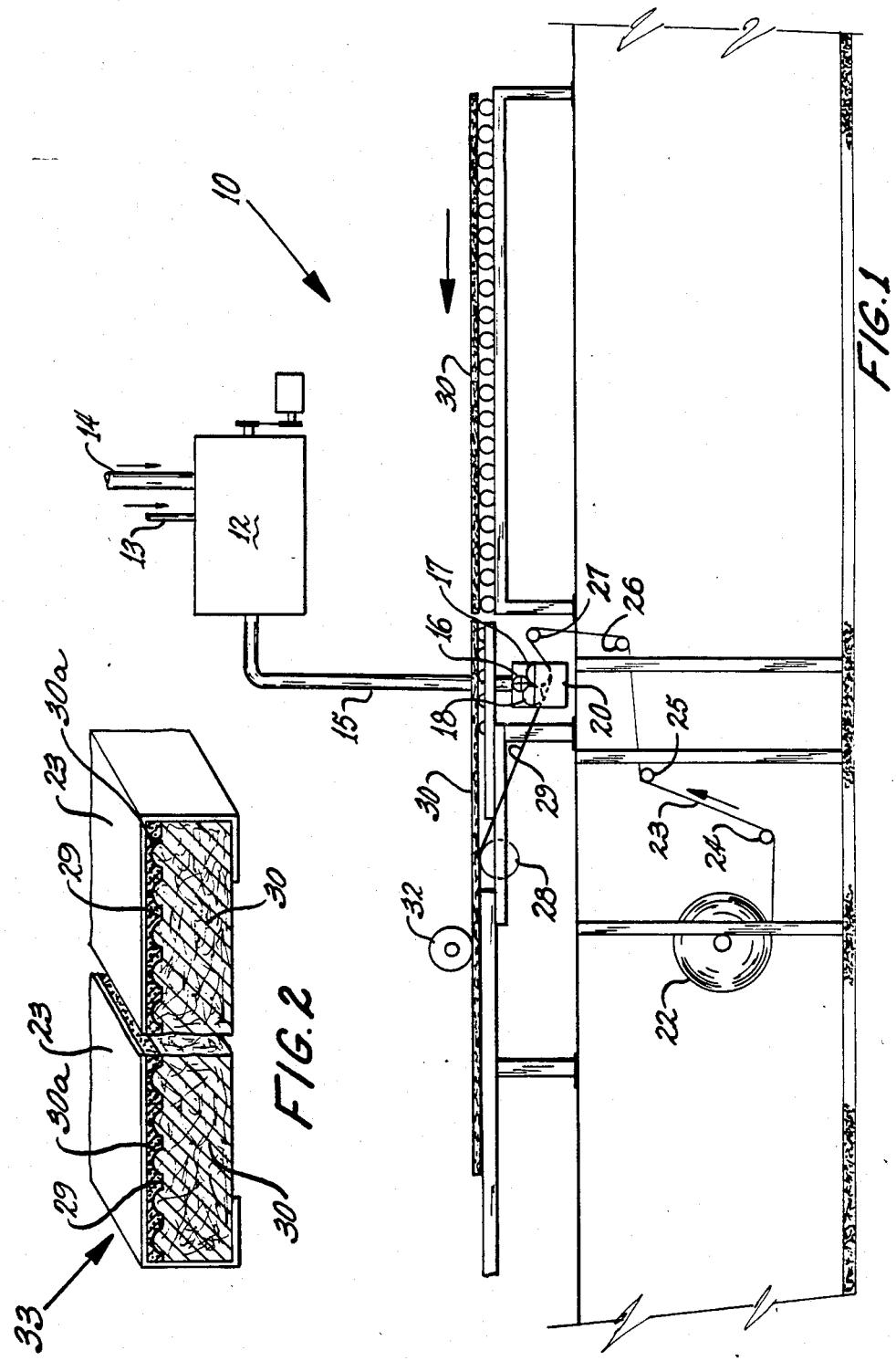

ROOF INSULATION BOARD AND METHOD OF MAKING

TECHNICAL FIELD

This invention relates generally to thermally insulating roofing boards, and more particularly to glass fiber boards with a top surfacing sheet adhered thereto for use in built-up roofing construction.

BACKGROUND ART

U.S. Pat. No. 2,132,969, issued to Justin L. Rau on Oct. 11, 1938, discloses refrigerator and automobile body panels coated on the inner side with foamed asphalt for sound deadening purposes.

U.S. Pat. No. 2,550,465, issued to Florian T. Gorski on Apr. 24, 1951, discloses a glass fiber board useful as roof deck insulation, the fibers in the board being bonded at their junctures with a thermosetting resin and the board being further impregnated with asphalt to coat the fibers along their lengths and also having layers of additional asphalt on one or both sides.

U.S. Pat. No. 3,050,427, issued to James Slayter et al. on Aug. 21, 1962, discloses a glass fiber board with foamed binder.

U.S. Pat. No. 3,144,376, issued to Leonard J. Plumberg on Aug. 11, 1964, discloses a glass fiber roof insulation board with a kraft paper sheet adhered thereto with asphalt, the sheet being strengthened by continuous glass strands in the asphalt.

U.S. Pat. No. 3,850,601, issued to Stuart H. Stapleford et al. on Nov. 26, 1974, discloses a glass fiber roof insulation board having additional reinforcement in an upper surface portion thereof in the form of chopped glass strand mixed with the usual discontinuous glass fibers. The upper portion with the additional chopped glass strand is impregnated with asphalt and covered with a latex parting agent or polyethylene fiber.

U.S. Pat. No. 3,853,683, issued to Stuart H. Stapleford et al. on Dec. 10, 1974, discloses a glass fiber roof insulation board with chopped glass strand in an upper surface layer mixed with the usual discontinuous glass fibers, and asphalt impregnated into the upper surface layer, further covered by a solid surfacing sheet of asphalt and polymeric materials reinforced with glass fibers.

U.S. Pat. No. 3,874,920, issued to David O. Richards et al. on Apr. 1, 1975, discloses a composite roof insulation board including a glass fiber board, a polyurethane foam slab on top of the glass fiber board, and a glass fiber mat on top of the foam slab. Alternate layers of asphalt and glass fiber mats are applied over the composite board to complete the roof insulation system.

U.S. Pat. No. 3,922,425, issued to Leonard J. Plumberg on Nov. 25, 1975, discloses a glass fiber roof insulation board with an asphalt saturated upper surface layer under a thin plastic surfacing sheet such as polyethylene or polypropylene.

DISCLOSURE OF INVENTION

In Accordance with the invention, asphalt is mechanically foamed before application to kraft paper, and the kraft paper coated on one side with the foamed asphalt is adhered thereby to a glass fiber board to produce a roof insulation board.

Although foamed asphalt is old in the art, the use of foamed asphalt as an adhesive to secure a facing sheet on a glass fiber roofing board is new. The prior art teaches overwhelmingly that non-foamed asphalt should be used for this purpose.

The use of the foamed asphalt adhesive has several advantages. A smaller weight of asphalt can be used on each roofing board in comparison with non-foamed asphalt, with resultant cost savings. The foamed asphalt also has a greater R value, or lower coefficient of heat conductivity, than non-foamed asphalt, resulting in greater insulation efficiency for the composite roofing board.

Other, more surprising results of the use of foamed asphalt adhesive are that the viscosity of the foamed asphalt is less sensitive to variations in temperature, in comparison to non-foamed asphalt, making the entire manufacturing process easier to control, and that the foamed asphalt has less tendency to penetrate or soak into the porous glass fiber board. As a result of the lower penetration tendency, the amount of penetration can be controlled and adjusted as desired. Further, the lower amount of penetration by foamed asphalt adhesive, in comparison to non-foamed asphalt, results in less deterioration of the R-value or insulation efficiency of the porous glass fiber board, resulting in a still greater R-value for the composite board. Perhaps even more significant, however, is the surprising result that the foamed asphalt adhesive provides better adhesion of the kraft paper facing to the glass fiber board, in comparison to non-foamed asphalt. This is because non-foamed asphalt has a greater tendency to soak into the board and may therefore leave as much as 10 to 30 percent of the space between the bumps on the board surface unfilled, such unfilled spaces providing no adhesion to the kraft paper. On the other hand, when foamed asphalt adhesive is used, because it has less tendency to soak into the porous glass fiber board, substantially 100% of the space between the bumps on the surface of the board becomes filled with foamed asphalt and provides adhesion to the kraft paper. In installations made so far, none of the kraft paper has peeled off when additional asphalt was mopped thereon in a built-up roofing process. Thus, even though a smaller weight of asphalt is used per board when using foamed asphalt than when using non-foamed asphalt, the product with the foamed asphalt adhesive is better in every way.

BRIEF DESCRIPTION OF THE DRAWINGS

FIG. 1 is a schematic side elevational view of apparatus for making the roof insulation board of the invention; and FIG. 2 is a fragmentary isometric view of a roof insulation board constructed in accordance with the invention.

BEST MODE OF CARRYING OUT THE INVENTION

With reference to the drawings, FIG. 1 shows an apparatus 10 for making the roof insulation board of the invention. The apparatus 10 includes a high-shear mixer 12 of the type wherein radial pins on a rotor interleave with stationary pins on a stator and air or an inert gas such as nitrogen is introduced under pressure. In Applicants' process, the mixer 12 is used with air, supplied under pressure through an inlet pipe 13, and hot liquid asphalt, supplied through a pipe 14, to produce mechanically and pneumatically foamed asphalt adhesive with density reduced to as low as 50% that of non-foamed asphalt adhesive. It may be advantageous to add a surfactant to the hot liquid asphalt, although this has been found not to be necessary.

From the mixer 12, the foamed asphalt adhesive is delivered through a pipe 15 to a distributing pipe 16 from which it is formed into a puddle between two rolls 17 and 18 of a foamed asphalt applicator also including a drip pan 20.

From a supply roll 22, a facing material 23, preferably kraft paper, is fed either under or over each of a plurality of rolls 24, 25, 26, and 27, at least one of which should be a tensioning roll, around the lower portion of the foamed asphalt applicator roll 17, and over a water cooled roll 28 into engagement with a lower side of glass fiber board material 30. The board material 30 and the facing 23, with foamed asphalt adhesive 29 on a side thereof facing the board material 30, are fed under an adjustable pressure roll 32 to firmly adhere the facing 23 to the board material. Preferably, the facing material 23 is wider than the board material 30, and suitable folding shoes (not shown) are provided to wrap the facing 23 around opposite edge portions of the board material 30, as shown in FIG. 2. Also, suitable means (not shown) is provided for cutting the faced board material into desired lengths.

It will be understood by those skilled in the art that the glass fiber board material 30 may be formed by spinning glass fibers from molten glass into a forming hood, spraying the fibers with a binder such as urea-phenol-formaldehyde, collecting the binder-coated fibers into a mat on a porous endless chain conveyor, and running the mat through an oven having porous upper and lower spaced endless chain conveyors to determine board thickness and cure the binder. The surfaces of the resulting glass fiber board material are bumpy, having a bump wherever there was a hole in the corresponding porous flight of the oven conveyor.

FIG. 2 shows a faced glass fiber roofing board 33 constructed in accordance with the invention and including a glass fiber board 30 having bumps 30a on an upper surface and kraft paper facing 23 adhered to the board 30 by foamed asphalt 29.

Various modifications may be made in the structure shown and described without departing from the spirit and scope of the invention.

We claim:

1. A roof insulation board comprising a glass fiber board and a facing adhered to one of two major faces thereof by foamed asphalt adhesive.

2. A roof insulation board as claimed in claim 1 wherein the facing is kraft paper.

3. A method of making a roof insulation board comprising adhering a facing to one of two major faces of a glass fiber board by foamed asphalt adhesive.

4. A method as claimed in claim 3 wherein the facing is kraft paper.

* * * * *